United States Patent [19]

Star

[11] Patent Number: 4,761,068

[45] Date of Patent: Aug. 2, 1988

[54] EYEGLASS FRAME HOLDER

[76] Inventor: John Star, P.O. Box 1314, Seaford, N.Y. 11783

[21] Appl. No.: 839,284

[22] Filed: Mar. 13, 1986

[51] Int. Cl.$^4$ ............................................. G02C 5/14
[52] U.S. Cl. ..................................... 351/156; 351/157
[58] Field of Search ..................... 351/123, 156, 157; 2/442

[56] References Cited

U.S. PATENT DOCUMENTS

| | | | |
|---|---|---|---|
| 1,819,738 | 8/1931 | Daniels | 351/156 X |
| 2,023,523 | 12/1935 | Grimball | 351/156 X |
| 3,728,012 | 4/1973 | Downey | 351/157 |
| 4,152,051 | 5/1979 | Van Tien et al. | 351/156 X |

*Primary Examiner*—Rodney B. Bovernick
*Attorney, Agent, or Firm*—Alfred M. Walker

[57] ABSTRACT

An eyeglass frame holder having a quick release two piece band with mushroomed shaped flexible tips mountable upon each of two bands, or eyeglass supports which tips are interconnected with eyeglass temple stems or supports through a hole in each of the stems, together with a C-shaped resilient clasp for making surface contact with the tips. The two pieces of the band are connected behind the eyeglass wearer's head with adjustable self-engaging, removable gripping pads (velcro).

1 Claim, 2 Drawing Sheets

EYEGLASS FRAME HOLDER

This invention relates to an eyeglass frame holder and in particular, to an adjustable mounting apparatus for mounting eyeglass frames with mushroomed tips, C-shaped clasp means holding the tips of adjustable, quick release, self-engaging (velcro) bands so that the eyeglass frames can be randomly placed upon the wearer's head and fastened accordingly with velcro straps.

BACKGROUND OF THE INVENTION

Eyeglass frame holders have been sought in Pendleton, U.S. Pat. No. 2,648,255, Wheeler U.S. Pat. No. 2,649,020, Speers, U.S. Pat. No. 2,798,409, Aubricht, U.S. Pat. No. 2,965,099, Lawrence, U.S. Pat. No. 3,879,804, Downey, U.S. Pat. No. 3,728,012, Enghofer, U.S. Pat. No. 4,479,703 and Van Tiem, U.S. Pat. No. 4,152,051. A common element of Pendleton, Speers and Enghofer is a flexible but uniformly compressible elastic band which provides a constant pressure subjecting the eyeglass wearer to occasional discomfort from the pressure of the band upon the head. Complicated, not easily removable retainer devices to hold a strap are provided in Enghofer, Lawrence, Pendleton, Van Diem and Aubricht. Permanent non-removable straps are provided in Downey. In Speers, a separate modification of the eyeglass frame temple member is required.

SUMMARY OF THE INVENTION

The invention provides an eyeglass frame holder having a quick release, two piece, self-engaging band mountable upon the eyeglass frame temple stems, which band has at each end mushroomed shaped flexible tips which are interconnected with the eyeglass temple stems or supports through a hole in each of the stems, together with a C-shaped resilient clasp for making surface contact with the tips. The two pieces of the band are connected behind the eyeglass wearer's head with adjustable, self-engaging gripping pads (velcro).

OBJECTS OF THE INVENTION

It is an object of the invention to provide a holder for eyeglass frames which quickly adapts to comfortably fit the wearer's head with an automatic adjustment of the fit.

It is a further object of the invention to provide an eyeglass frame holder which may be removed quickly with minimum adjustment.

It is a further object of the invention to provide an eyeglass frame holder which frictionally engages the head of the wearer without undue pressure.

It is a further object of the invention to provide a retainer for the eyeglass holder which allows for both firm retention of the holder and for easy removal of the holder. The eyeglass frames may be placed and secured randomly at any position upon the wearer's head since the band's removable, self-engaging pads function in a quick-release fashion. The two pieces of the band are secured to each of the temple stems by the C-shaped clasps, which are frictionally engaged to the supporting temple stems. Deformable mushroomed shaped tips are provided at the ends of the bands to permit flexible but frictional engagement of each end of the band with each of the eyeglass temple stems.

The quick release element overcomes the problems associated with the loosening of eyeglasses upon the head due to the effects of gravity and the elements of heat expansion and contraction of plastic eyeglass frames. With a quick release mechanism, the fit of the frames may be adjusted to overcome the loosening of the frames upon the wearer's head. This overcomes the problems associated with existing eyeglass holders with complicated clip-type or other not easily removable strap retainer devices.

Because the band frictionally engaging the wearer's head has self-engaging, removable gripping pads,(such as Velcro pads), the band may be adjusted for a comfortable fit without the constant pressure of compressible elastic bands.

The invention also provides retainers for the band which provide a snug fit, but which can facilitate easy removal of the band from the frame for cosmetic reasons in periods of light activity which do not require the wearer to utilize an eyeglass frame holder. To this end, the band has at its end point a deformable mushroomed shaped tip which protrudes through a circular hole in the eyeglass frame temple stem so that the expanded portion of the tip prevents the band from re-entering the hole. To further insure that the deformable, mushroomed shaped tip snugly fits on the outside of the hole, a C-shaped resilient clasp is provided to make interference surface contact with the interior portion of the mushroomed tip and prevent the deforming and re-entry of the tip through the hole. By changing the surface contact of the bands held in place at one end by the self-engaging gripping pads, the user may intermittently and randomly adjust the frames upon the head with a snug fit, even during periods of vigorous activity.

In this embodiment, the two pieces of the band are made of a flexible material and have adjustable, self-engaging gripping pads, such as Velcro, laminated to them so that the individual band pieces may be frictionally engaged upon the head by random adjustment. This has the advantage of allowing the user to quickly change the position of the band if the position of the eyeglass frame changes locations upon the head due to heat expansion or contraction.

In another embodiment, the band is fastened at one end into a resilient C-shaped clasp shape for surface contact directly upon the eyeglass frame temple stem.

In a further embodiment, each piece of the band is covered at the end with a cylindrical crip tip. Separate resilient C-shaped clasp means make surface contact so that the band may be mounted upon the frame stem.

BRIEF DESCRIPTION OF DRAWINGS

To better understand the invention, reference is made to the accompanying drawings which are offered by way of example and which are not to be taken as limiting the invention, taken together with the accompanying drawings in which.

DESCRIPTION OF PREFERRED EMBODIMENT

Figure 1:
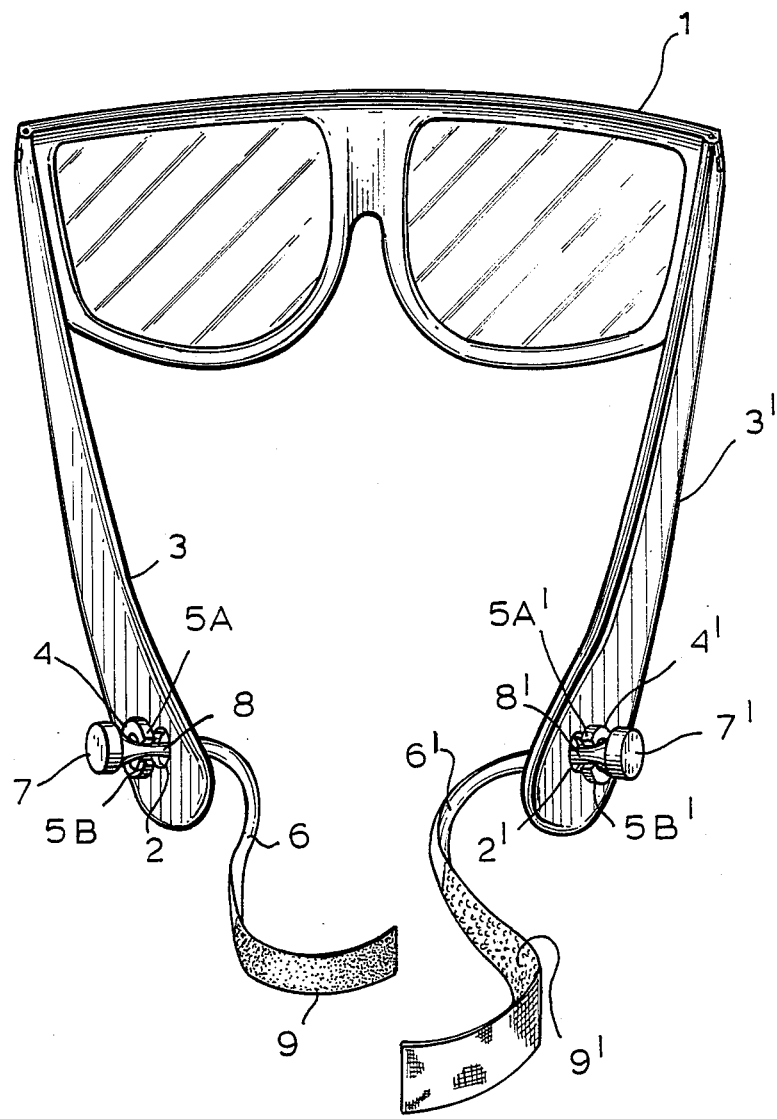
FIG. 1 is a perspective view of the device mounted upon an eyeglass frame in frictional engagement.
Figure 2:
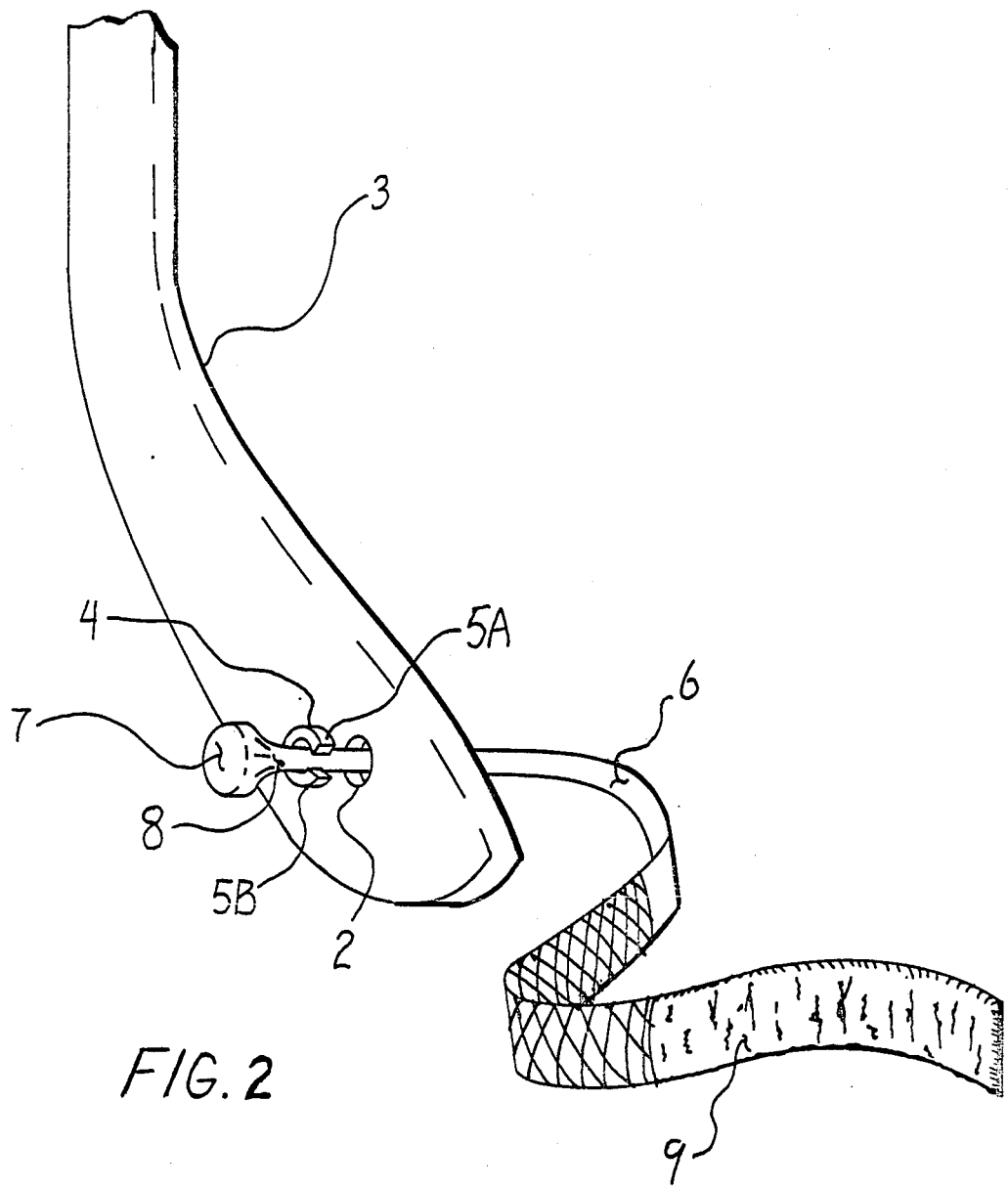
FIG. 2 is a close-up view of the device system.

Referring to FIGS. 1-4, there is shown an eyeglass frame, 1, having holes 2 and $2^1$ disposed at the ends of frame stem supports 3 and $3^1$. A retaining holder is provided comprising resilient C-shaped clasps 4 and $4^1$ each having two converging prongs 5A and 5B which are frictionally engaged upon flexible bands, 6 and $6^1$. Bands 6 and $6^1$ have at the ends deformable mushroomed shaped tips 7 and $7^1$ which are extendable through holes 2 and $2^1$ of stem supports 3 and $3^1$. To secure the bands 6 and 6¹ to stem supports 3 and 3¹, the prongs of resilient C-shaped clasps 4 and 4¹ frictionally engage bands 6 and 6¹ for surface contact upon the bands 6 and 6¹ at a point between the diverging necks 8 and 8¹ of deformable mushroomed tips 7 and 7¹ and the exterior surface of stem supports 3 and 3¹. Bands 6 and 6¹ contain at their other ends male and female adjustable, self-engaging gripping pads 9 and 9¹, made of a material, (Velcro), so that the bands may be tightened and loosened in a quick release fashion. By virtue of the fact that the bands 6 and 6¹ can be adjusted, the user is not faced with the problem of the constant pressure of a compressible elastic band upon the head.

The invention is also an improvement over prior art because no structural modifications to eyeglass stem supports 3 and 3¹ are necessary other than the introduction of holes 2 and 2¹. Furthermore, the invention obviates the necessity of complicated, not easily removable retainer devices to engage bands 6 and 6¹ with stem supports 3 and 3¹.

Deformable mushroom tips 7 and 7¹ of bands 6 and 6¹ fit snugly within holes 2 and 2¹ of the device by the application of pressure from prongs 5 and 5¹ of resilient C-shaped clasps 4 and 4¹ disposed upon the diverging necks 8 and 8¹ of tips 7 and 7¹.

Clasps 4 and 4¹ contain C-shaped prongs 5 and 5¹ having a circular tension so that prongs 5 and 5¹ will fit snugly over bands 6 and 6¹ while maintaining frictional surface contact.

In the embodiment, the spring loaded configuration of C-shaped clasps 4 and 4¹ containing prongs 5 and 5¹, enables the bands 6 and 6¹ to be removed from stem supports 3 and 3¹. In addition, the self-engaging gripping pads 9 and 9¹ of bands 6 and 6¹ provide for quick release and adjustment of the frames 1 upon the wearer's head.

Although a specific embodiment of the present invention have been illustrated, it is to be understood that many changes and modifications thereof can be made without departing from the spirit of the invention as defined in the following claims.

I claim:

1. An adjustable eyeglass frame holder for retaining eyeglass frames upon the head of a wearer, the holder comprising:

an eyeglass frame with two support stem; a retaining means having a pair of interlocking bands each having adjustable, self-engaging removable male-female gripping pads connected to said retaining means for securing said frame about said head, each of said bands disposed to said support stems having a deformable mushroom shaped tip disposed at said ends of said bands, said bands being penetrable into a hole located through and at the end of each of said stems, each of said bands also having a C-shaped clasp means having a plurality of resilient prongs acting in circular tension for making surface contact with each of said bands at a point on said bands between the said mushroom shaped tip and said hole in said stem.

* * * * *